(12) United States Patent
Martin et al.

(10) Patent No.: US 6,981,097 B2
(45) Date of Patent: Dec. 27, 2005

(54) TOKEN BASED CACHE-COHERENCE PROTOCOL

(75) Inventors: Milo M. K. Martin, Madison, WI (US); Mark Donald Hill, Madison, WI (US); David Allen Wood, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 293 days.

(21) Appl. No.: 10/389,861

(22) Filed: Mar. 14, 2003

(65) Prior Publication Data

US 2004/0181636 A1   Sep. 16, 2004

(51) Int. Cl.⁷ ............................................. G06F 12/00
(52) U.S. Cl. ................. 711/130; 711/141; 711/142; 711/143; 711/144; 711/145; 707/8; 707/201
(58) Field of Search .................... 707/8, 201; 709/216; 711/141–145, 130

(56) References Cited

U.S. PATENT DOCUMENTS 6,119,151 A * 9/2000 Cantrell et al. ............. 709/216
6,385,701 B1 * 5/2002 Krein et al. ................. 711/141
6,449,614 B1 * 9/2002 Marcotte ....................... 707/8

\* cited by examiner

Primary Examiner—T Nguyen
(74) Attorney, Agent, or Firm—Quarles & Brady LLP

(57) ABSTRACT

A cache coherence mechanism for a shared memory computer architecture employs tokens to designate a particular node's rights with respect to writing or reading a block of shared memory. The token system provides a correctness substrate to which a number of performance protocols may be freely added.

36 Claims, 4 Drawing Sheets

| | NO TOKENS | SOME TOKENS NO OWNERS TOKENS | SOME TOKENS OWNER TOKENS | ALL TOKENS |
|---|---|---|---|---|
| REQUEST FOR READ ACCESS | IGNORE | IGNORE | SEND 1 TOKEN (NOT OWNER) PLUS DATA | IF WRITE COMPLETE, SEND ALL TOKENS AND DATA, ELSE SEND DATA & TOKEN (NOT OWNER) |
| REQUEST FOR WRITE ACCESS | IGNORE | SEND ALL TOKENS | SEND ALL TOKENS AND DATA | SEND ALL TOKENS AND DATA |

| NODE | BLOCK |
|---|---|
| 1 | A |
| 3 | A |
| 2 | A |

TOKEN BASED CACHE-COHERENCE PROTOCOL

CROSS-REFERENCE TO RELATED APPLICATIONS

STATEMENT REGARDING FEDERALLY SPONSORED RESEARCH OR DEVELOPMENT

FIELD OF THE INVENTION

The present invention relates generally to a system for coordinating cache memories in a computing system.

BACKGROUND OF THE INVENTION

Large computer software applications, such as simulators and database servers, require cost-effective computation beyond that which can be provided by a single microprocessor. Shared-memory, multiprocessor computers have emerged as a popular solution for running such applications. Most shared memory multiprocessor computers provide each constituent processor with a cache memory into which portions of the shared memory ("blocks") may be loaded. The cache memory allows faster memory access.

A cache coherence protocol ensures that the contents of the cache memories accurately reflect the contents of the shared memory. Generally, such protocols invalidate all other caches when one cache is written to, and update the main memory before a changed cache is flushed.

Two important classes of protocols for maintaining cache coherence are "directories" and "snooping". In the directory protocols, a given "node" typically being a cache/processor combination, "unicasts" its request for a block of memory to a directory which maintains information indicating those other nodes using that particular memory block. The directory then "multicasts" requests for that block directly to a limited number of indicated nodes. Generally, the multicast will be to a superset of the nodes greater than the number that actually have ownership or sharing privileges because of transactions which are not recorded in the directory, as is understood in the art. The "indirection" of directory protocols, requiring messages exchanged with the directory prior to communication between processors, limits the speed of directory protocols.

The problem of indirection is avoided in snooping protocols where a given cache may "broadcast" a request for a block of memory to all other "nodes" in the system. The nodes include all other caches and the shared memory itself. The node "owning" that block responds directly to the requesting node, forwarding the desired block of memory.

Snooping, however, requires that "message ordering" be preserved on the interconnection between communicating nodes. Generally this means each node can unambiguously determine the logical order in which all messages must be processed. This has been traditionally guaranteed by a shared wire bus. Without such ordering, for example, a first node may ask for a writeable copy of a block held by memory at the same time that it sends messages to other nodes invalidating their copies of the block in cache for reading. A second node receiving the invalidation message may ignore it because the second node does not have the block, but then the second node may request the block for reading before the first node receives the block from memory for writing. When the first node finally does receive the block, the second node erroneously believes it has a readable copy.

The "correctness" of memory access in snooping is tightly linked to this requirement of a message ordering in the communications between processors. This and other requirements of the snooping protocol complicate any modifications of snooping to increase its performance.

BRIEF SUMMARY OF THE INVENTION

In the invention, memory access is controlled by "tokens" whose number is globally "known" and whose possession by a node simply and intuitively designates the state of a node's cache blocks. Generally speaking, a node having all the tokens for a block may write to or read from the block, a node having at least one token but less than all tokens may only read from the block, and a node having no tokens can neither write to nor read from the block.

By and large, this system provides certainty in the "correctness" of memory access independent of most other aspects of the cache coherence protocol. The invention thereby provides a robust foundation (a "correctness substrate") on which a variety of other performance enhancing protocol steps may be readily added.

Specifically, the present invention provides a shared memory computer architecture having at least two processor units (each having a processor and cache), a shared memory, and an interconnect allowing communication between the processor units and the shared memory. The invention also provides cache management circuitry operating to: (i) establish a set of tokens of known number; (ii) allow a processor to write to at least a portion of the shared memory through its cache only if it has all the tokens for that portion; and (iii) allow a processor to read from at least a portion of the shared memory through its cache only if it has at least one of the tokens for that portion.

Thus, it is one object of the invention to provide a simple and intuitive protocol for coordinating memory access in a shared memory computer system.

The cache management circuitry may be distributed among the processor units and the memory.

Thus, it is another object of the invention to provide an architecture that may work with a variety of different architecture models including "glueless" architectures in which most circuitry is contained in a replicated, elemental building block.

The cache management circuitry may respond to a request by a processor unit to write to a portion of shared memory by sending to other processor units a write request for that portion. The cache management circuitry may further respond to the write request at a receiving processor having at least one token for a portion, to send all tokens for that portion held by the receiving processor to the requesting processor.

Thus, it is an object of the invention to provide a simple method of transferring cache write permission.

The request may be broadcast to all other processor units.

Thus, it is another object of the invention to provide a simple broadcast-based protocol. Notwithstanding this object, the present invention may also work with multicast transmissions to conserve bandwidth and thus improve performance.

One token may be an "owner" token and the cache management circuitry responding to the write request may send the portion of the shared memory held by the receiving processor and the tokens to the requesting processor only when the receiving processor holds the owner token.

Receiving processor units not having the owner token also send their token but need not send the portion of shared memory.

Thus, it is an object of the invention to reduce interconnect data traffic. Processor units which are not owners may transmit their tokens without data, knowing that the owner will transmit that data.

The cache management circuitry may alternatively respond to a read request by sending to other processor units a read request message, and the cache management circuitry may respond to the read request message at receiving processors having at least one token to send at least one token for that portion held by the receiving processor to the requesting processor. In a preferred embodiment, typically only one token is sent.

It is thus another object of the invention to minimize the unnecessary movement of tokens. On the other hand, multiple tokens may be sent if predictively it is expected that the receiving processing unit may need write permission shortly.

When the receiving processor has the owner token, the cache management circuit may send a token that is not the owner token unless the receiving processor has only one token.

Thus, it is one object of the invention to avoid unnecessary transmission of the ownership token which normally must be accompanied by the data of the requested portion of shared memory.

The cache management circuitry may respond to a predetermined failure of a requesting processor to obtain tokens, by retransmitting to other processors a request to the portion after a back-off time. The back-off time may be randomized and/or increased for each retransmission.

Thus it is another object of the invention to reduce situations where a processor unit does not promptly get the tokens, permission and/or data it is seeking. By repeating the request after a back-off time, collisions may be efficiently avoided in most cases.

The cache management circuitry may respond to a predetermined failure of a requesting processor to obtain tokens by transmitting to other processors a persistent request requiring the other processor to forward tokens for that portion of shared memory until a deactivation message is received and wherein the requesting processor allows a deactivation signal only after receiving the necessary tokens. The cache management circuitry responds to the persistent request to send any necessary tokens for the portion held or received by the receiving processor between the occurrence of the persistent request and the deactivation signal.

Thus, it is another object of the invention to provide for a mechanism that assures no starvation of a given processor.

When multiple requesting processors fail to obtain tokens, the cache management circuitry may select one processor unit to benefit from a persistent request and then a second after the first has completed its token acquisition.

Thus, it is another object of the invention to allow the imposition of an arbitration mechanism in the case of conflicts between processor units.

The cache management circuitry may select the order of service of the multiple requesting processors to minimize the communication burden between successive multiple processors.

Thus, it is another object of the invention to provide a mechanism for more sophisticated resolution of conflicting memory requests based on minimizing data transmission time or costs.

The interconnect may be an unordered interconnect.

It is thus a further object of the invention to provide a cache coherence protocol that does not require the hardware overhead and complexity of a message ordered interconnect.

These particular objects and advantages may apply to only some embodiments falling within the claims and thus do not define the scope of the invention.

DETAILED DESCRIPTION OF THE PREFERRED EMBODIMENTS

System Elements

Figure 1:
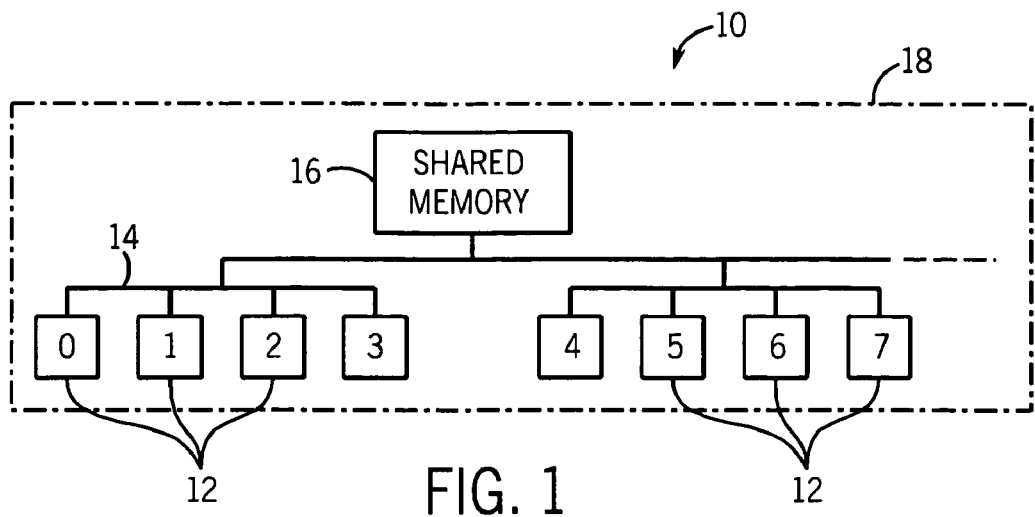
FIG. 1 is a blocked diagram of a multiprocessor, shared-memory computer system having sets of processor units, including a processor and cache, communicating on a network with a common shared memory.

Referring now to FIG. 1, a multiprocessor, shared-memory computer system 10 may include a number of processor units 12 communicating via an interconnect 14 with a shared memory 16. The processor units 12 and shared memory 16 will be referred to collectively as "nodes". Cache management circuitry 18 communicates with the processor units 12 and the shared memory 16 to control access by the processor units 12 of the shared memory 16. The cache management circuitry 18 may be distributed among the nodes and/or may have centralized components to be compatible with a wide variety of computer architectures.

Referring still to FIG. 1, the shared memory 16 may be, for example, high speed solid state memory and provides a common storage area for data used by all the processor units 12. Although the shared memory 16 is depicted as a unitary structure, in practice, the shared memory 16 may be distributed over the interconnect 14 or even among the different processor units 12.

The interconnect 14 may be, for example, a parallel bus structure or a serial network and may have a tiered structure, as shown, generally reflecting differences in communication speed between processor units 12. For example, the processor units 12 may be organized into clusters, here labeled $P_0$–$P_3$ for a first cluster and $P_4$–$P_7$ for a second cluster. Communications within a cluster may be faster than communications between clusters and, for this reason, each of the processor units 12 may be assigned an identification number generally reflecting its relative proximity to other processor units 12. Closer numbers can indicate closer proximities and this information may be used to optimize data transfer as will be described below. The interconnect 14 may use a virtual network to avoid deadlocks, as is understood in the art.

Figure 2:
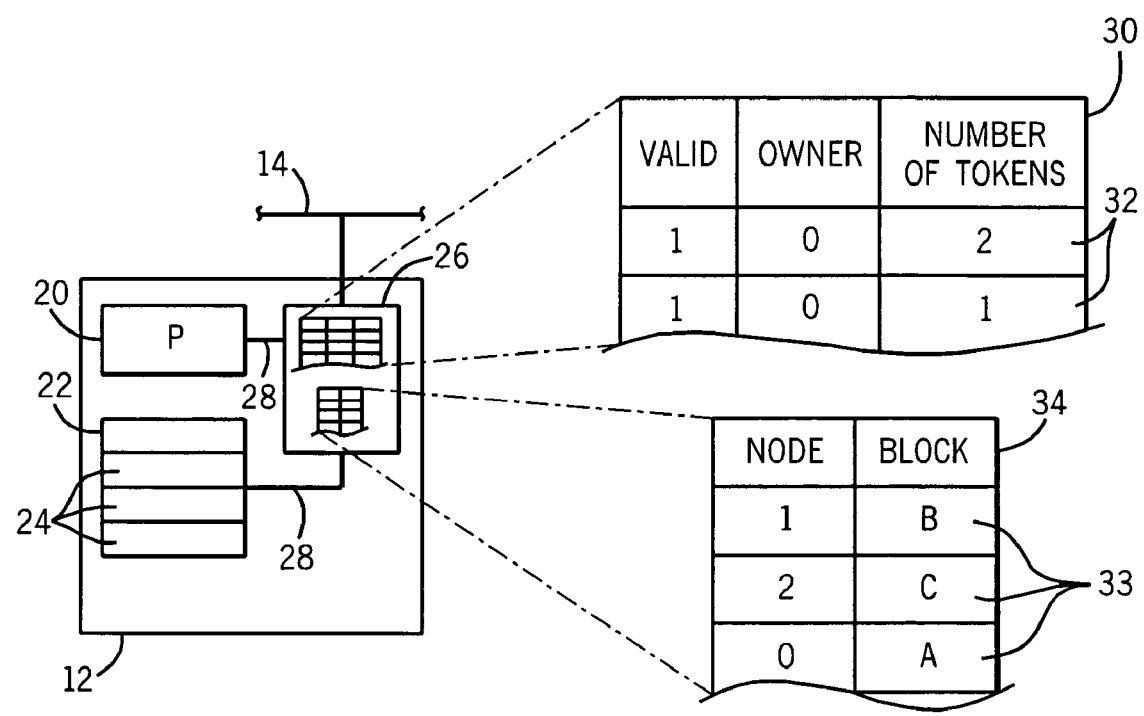
FIG. 2 is a detailed block diagram of a processor unit showing the processor, cache, and a portion of the cache controller circuitry in turn having a token table and a persistent request table.

Referring to FIG. 2, each processor unit 12 includes a processor 20 communicating with one or more cache levels (shown for clarity as a single cache 22). The cache 22 is typically divided into a number of blocks 24 representing convenient units of data transfer between the shared memory 16 and the processor units 12. The cache 22 and processor 20 communicate via an internal bus 28 with cache controller 26, being part of the cache management circuitry 18, which in turn connects to the interconnect 14.

Generally, the cache controller 26 will operate to move blocks of the shared memory 16 into the cache 22 for rapid access (reading and writing) by the processor 20. The cache controller 26 will then hold the block or transfer it to another processor unit 12 or if the block must be evicted, return the block to shared memory 16. As will be described in greater detail below, the cache controller performs these operations using a set of tokens that may be passed among the nodes by messages on the interconnect 14. Generally, token possession maps to traditional cache coherence states where a node having all T tokens for a given cache block 24 holds the block in a modified (M) state. A node having one to T minus one tokens holds the block in a shared (S) state, and a node having no tokens holds the block in an invalid state (I). Each of these states will be recognized by one of ordinary skill in the art. Through the use of tokens, correctness in data access is ensured without the need for detailed knowledge about stable and transient protocol states, data acknowledgement messages, and interconnect and/or system hierarchy.

In accomplishing its task, the cache controller 26 employs a token table 30 providing, effectively, one row 32 for each block 24 of the cache 22. A third column of each row 32 indicates the number of tokens held by the processor units 12 for a particular block 24. It is through this token table 30 that tokens are "held" by a processor unit 12 after being transmitted between the processor units 12 and/or the shared memory 16 over the interconnect 14. This information about the number of tokens is linked to a valid bit in a first column of the row 32 and an owner bit in a second column of the row 32. The owner bit is set when one of the tokens held is a system-unique owner token as will be described below. The valid bit indicates that the data of the block 24 associated with the tokens of the row 32 is valid and is not required in the simplest version of the protocol. In this more complex version using a valid bit, it is possible to hold tokens without valid data of the block 24. This can be useful if a data-less message arrives with a token prior to arrival of other messages with tokens and the necessary data.

Shared memory 16 also has a token table 30 (not shown) so it can acquire and share tokens. Initially all tokens are held by the shared memory 16.

Each node also includes or shares a persistent request table 34 providing, for example, a number of logical rows 33 equal to a number of nodes in the multiprocessor, shared-memory computer system 10. The cache controller 26 and shared memory 16 can thus have access to the persistent request table 34. Each row 33 is identified to a node by a node number in a first column. A second column of each row 33 identifies a particular block 24, if any, for which the node is making a persistent request. The use of a persistent request will be described below.

A Request to Read Shared Memory

Figure 3:
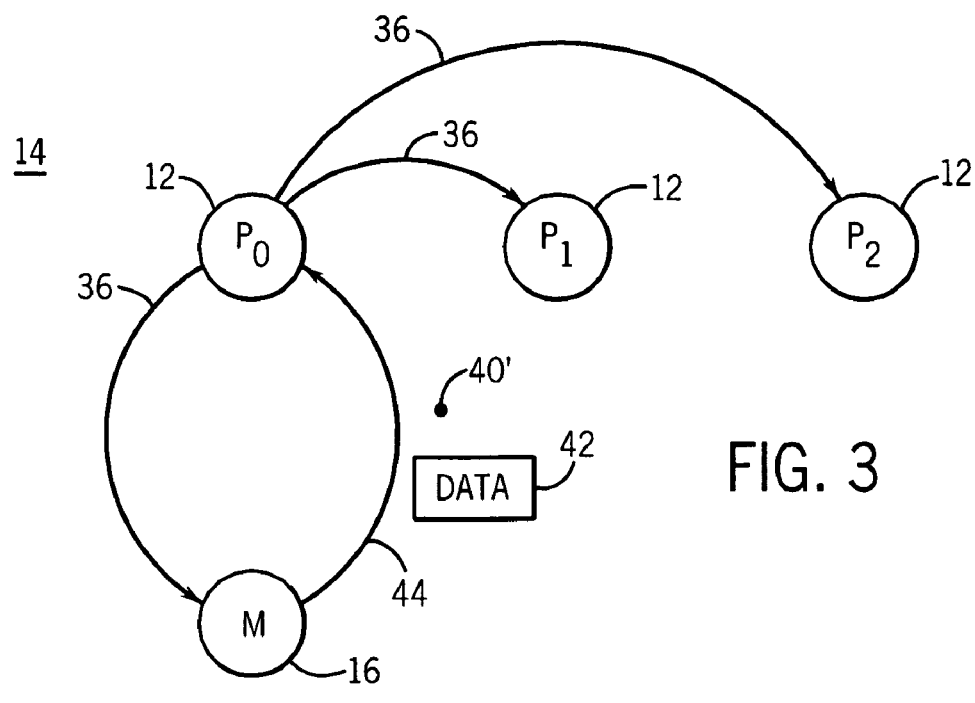
FIG. 3 is a representation of token flow between processor units and the shared memory required for a processor to read shared memory.

Referring now generally to FIGS. 2 and 3, the cache management circuitry 18 initially establishes a set of tokens that will be transmitted between nodes requesting read or write permissions for the shared memory 16. The tokens may be fixed in number or another mechanism may be adopted so that all components know the total number of tokens. No exclusively local action may change the number of tokens without eventual global communication of that change. The tokens are transmitted as specific data patterns and have no physical embodiment. The tokens are transmitted and control the processor units according the following invariants enforced by the cache management circuitry 18.

Invariant I: At all times each cache block 24 has an established number of tokens. Optionally, and as will be described here, one token may be the owner token. Each cache block 24 may have a different number of tokens so long as this number is known globally.

Invariant II: A node can write a block 24 only if it holds all T tokens for that block 24.

Invariant III: A node can read a block 24 only if it holds at least one token for that block 24. Optionally, and as will be described here, the node may also need to check to see that it has valid data by checking the valid data bit.

Invariant IV: If a cache coherence message contains data of a block 24, it must contain at least one token.

Invariant V: If a cache coherence message contains one or more tokens it must contain data of the block. Optionally, and as will be described here, the data need only be sent if the message contains the owner token.

These invariants are sufficient to ensure correctness of memory access and requires at a minimum, T undifferentiated tokens for each block. The number of tokens may desirably be greater than the number of nodes without upsetting the correctness provided by the token system. A greater number of tokens addresses the fact that some tokens will be in transit between nodes and allows a greater freedom in reading the shared memory 16 such as may be desired in certain architectures exhibiting some types of timing constraints. With some loss in performance, a number of tokens less that the number of nodes may also be used.

An optional improvement in efficiency of transfer of blocks 24 between processor units 12 may be obtained by the addition of one differentiated token called the "owner" token. The owner token may be transmitted over the interconnect 14 and recorded in the token table 30 by the setting of the owner bit as has been described above. In the following examples, it will be assumed that an owner token is used, however, it will be understood that the owner token is not required for correctness. Thus, the owner token is simply a performance-enhancing feature of a type that may be grafted onto the correctness substrate by the tokens. Generally, the owner token carries with it a responsibility not to discard the data and to be the node to transmit the data when it is requested.

Referring now to FIG. 3, in a simple memory access example, a given processor unit $P_0$ may need to read a particular block 24 of shared memory 16. As an initial matter, it will be assumed that the block 24 is held in the shared memory 16 and the four tokens 40 associated with each of the nodes of the processor units 12 and shared memory 16 are initially held at shared memory 16.

Per invariant III, the processor unit $P_0$ cannot read the block 24 from its cache 22 until it has at least one token 40. Accordingly, the cache processor unit $P_0$ (via its cache controller 26) transmits a read message 36 requesting tokens over the interconnect 14 in broadcast fashion to each of the remaining nodes of processor units $P_1$ and $P_2$ and shared memory 16. This broadcast does not require the processor unit $P_0$ to know the node at which valid data of the block 24 is held.

In an alternative embodiment, the broadcasting described herein may be a single or multi-cast based on predictions of the location of the tokens. Such predictions may be based on an observation of historical movement of the tokens or imperfect monitoring of token location through the transmitted messages. As will be understood from this description, the token system ensures data correctness even in the event of incorrect predictions.

Figures 5, 6:
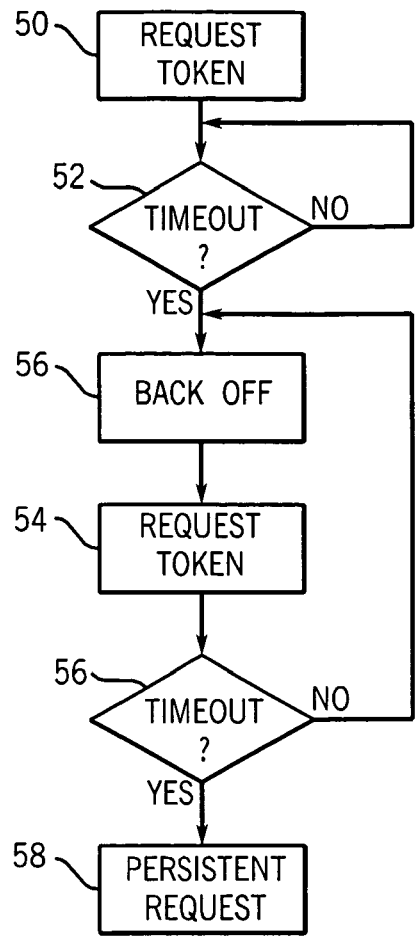
FIG. 5 is a flow chart of the steps executed by the cache controller circuitry when a processor unit cannot obtain desired tokens within a predetermined period of time.
FIG. 6 is a table showing the response of a processor unit to different requests by other processor units for tokens as implemented by the cache control circuitry.

Referring to FIG. 6, upon receipt of the read messages by the nodes, a set of standard responses enforced by the cache controller 26 will occur. The table of FIG. 6 describes generally four possible states of the receiving node (for a read request) as determined by the tokens 40 it holds. The receiving node may have no tokens 40 as indicated by the first column; some tokens 40 but no owner token 40 as indicated by the second column; some tokens 40 but not all the tokens 40 and the owner token 40 as indicated by the third column; and all the tokens 40 as indicated by the fourth column.

In the example of FIG. 3, processor units $P_1$ and $P_2$ each have no tokens 40 for the block 24, so a request for read of the block 24 will cause the processor units $P_1$ and $P_2$ to ignore the message as indicated by the response of the first column of the table of FIG. 6. This response may, under certain circumstances provide for an acknowledgement message, but no data is transmitted because processor units $P_1$ and $P_2$ do not have valid block data or tokens 40.

If processor units $P_1$ or $P_2$ had tokens 40 but not the owner token 40, per the second column of the table of FIG. 6, they would also not respond, knowing the node with the owner token 40 will respond per the third column of the table of FIG. 6. If processor units $P_1$ or $P_2$ had less than all the tokens 40 and owner token 40, per the third column of the table of FIG. 6, they would respond with the data of the block 24 and a token 40, but optionally not the owner token 40 unless that was all they had. A programmed reluctance to give up the owner token 40 is one way to enhance performance by minimizing transfer of ownership unless there is a compelling reason to do so. If the node has only the owner token, then it must send the owner token.

Referring again to the example of FIG. 3, in contrast to processor units $P_1$ and $P_2$, shared memory 16 has valid data of the block 24 indicated by the existence of at least one token 40 in the token table 30 of the shared memory 16. Accordingly, the shared memory 16 responds with one token 40' in a reply message 44 to processor unit $P_0$ per the fourth column of the table of FIG. 6. Because shared memory 16 has the owner token 40 (indicated by a star next to the token symbol of FIG. 3) the shared memory will also send the data 42 of the block 24 requested per invariant V. The use of the owner token 40 in this case is intended to eliminate the need for several nodes which have tokens 40 to all send duplicative data 42. Interconnect traffic is significantly reduced through the use of the owner token 40 as described. Note that the shared memory 16 does not send the owner token 40.

In a performance enhanced version of the response of column four of the table of FIG. 6, when a read request is received by processor unit $P_1$ for example, holding all of the tokens 40, the processor unit $P_1$ sends all tokens 40 to the requesting node processor unit $P_0$ if a write was recently completed by the processor unit $P_1$. This rule accommodates migratory data sharing patterns well known to those of ordinary skill in the art. In the case where the reading of the block has not been completed at processor unit $P_1$, only one token 40 is sent and preferably not the owner token 40 under the assumption that a read or a write at processor unit $P_1$ will be forthcoming and less data will ultimately need to be transmitted back to processor unit $P_1$.

Briefly, if no owner token 40 were used, the second column of the table of FIG. 6 would be omitted and all nodes would send a token 40 and data 42.

Referring still to the example of FIG. 3, at the conclusion of this read request, processor unit $P_0$ has a single token 40 and the data of the block 24 from the shared memory 16 and thus may read the block that it desires.

A Request to Write to Shared Memory

Figure 4:
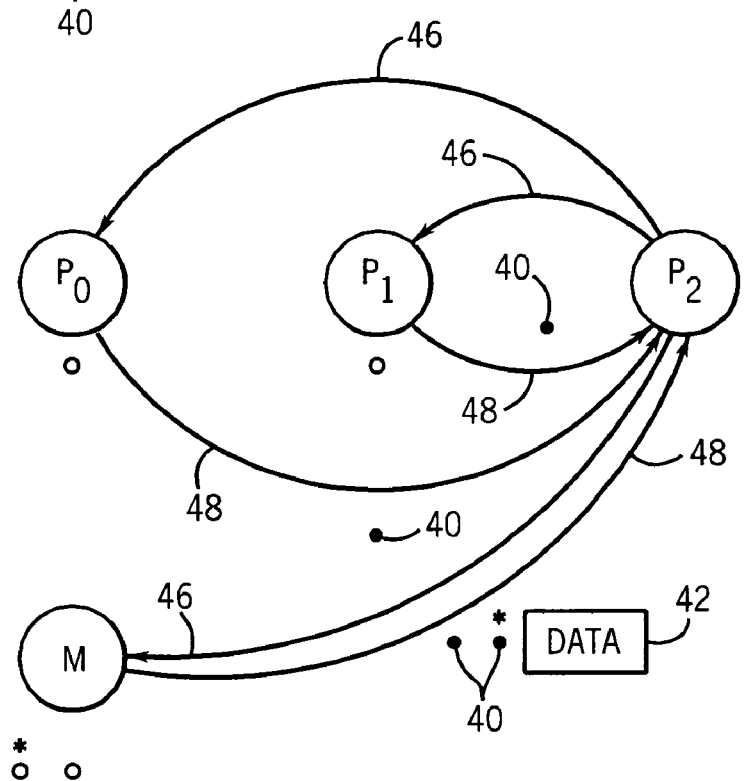
FIG. 4 is a figure similar to that of FIG. 3 showing token flow between processor units and the shared memory required for a processor to write shared memory.

Referring now to FIG. 4, two processor units $P_0$ and $P_1$ may each initially have one token 40 and the shared memory 16 may initially have two tokens 40. In the event that the third processor unit $P_2$ requests write access to a block 24 represented by those tokens 40, processor unit $P_2$ will broadcast write requests 46 to each of the other nodes of processor units $P_0$ and $P_1$ and shared memory 16. Referring to the first column of the table of FIG. 6, any node having no token 40 may simply ignore this request. However, processor units $P_0$ and $P_1$ each have one token 40, and thus, per the second column of the table of FIG. 6, will reply by sending all their tokens 40 in a reply message 48. In this case, the shared memory 16 has the owner token 40 and so under the third column of the table of FIG. 6, the shared memory 16 sends all its tokens 40 and the necessary data of the block 24. The same result would be obtained if the shared memory 16 had all tokens 40 and thus implicitly the ownership token 40.

At any time, because of the non-ordered nature of the interconnect 14, a node may receive tokens 40 that are not expected. In order to accommodate possible limits in data storage at the nodes, unwanted tokens 40 and data may be resent by the node, typically to the shared memory 16 to avoid the need for local storage. Additionally, when storage space is required in any node, that node may on its own initiative, send its tokens 40 to the shared memory 16 to free-up space. Only the node having the owner token 40 carries with it a duty to send the actual data. In implementations where an owner token 40 is not used, data associated with each token 40 must be transmitted by the node when it evicts the tokens 40.

More sophisticated protocols than those shown in FIG. 6 may be used to enhance performance over the correctness substrate provided. For example, write or read requests may be predictively limited to subsets of the nodes where the data is expected to be found to reduce bandwidth on the interconnect 14. Correctness is ultimately ensured by the tokens 40, independent of the accuracy of the predictions as to where the tokens may be found.

Token Access Guarantees

It will be understood, from the above, that the passing of the tokens 40 provides a definitive indication of the rights of each node to access a block of the shared memory 16. However, the particular protocols, as defined by the numbered invariants above and shown in the table of FIG. 6, do not ensure that a given node will ever get the necessary tokens 40. "Starvation" may occur, for example, when two competing nodes both requiring write access are repeatedly interrupted in their token gathering by each other or a third node requesting read access. Thus, as a practical matter, the issue of memory access "starvation" must also be addressed ensuring that a given node requesting access ultimately does get the access in a reasonably timely manner.

The present invention provides two methods of dealing with access starvation, however, it is contemplated that other methods may also be used and several methods may be combined.

Referring to FIG. 5, the cache management circuitry 18 of each processor unit 12 may monitor token requests indicated by process block 50 at that processor unit 12. After a predetermined period of time has elapsed without receipt of the requested tokens 40 for reading or writing to shared memory 16, as indicated by the loop formed with decision block 52, the cache controller 26 may delay for a back-off time per block 56 and reissue the request for the token 40 indicated by process block 54. The back-off time may be a randomly selected time period within a range which increases for each invocation of the back-off time block 56, for example, like the back-off time used in communication protocols like Ethernet. The back-off time may, for example, be twice the average miss latency and may adapt to average miss latency on a dynamic basis.

This back-off time and repeated request per process blocks 56 and 54 may be repeated for a given number of times, for example, four times, per decision block 56 and the loop formed thereby.

After completion of the timeout period implemented by the decision block 56, if the tokens 40 have not been received so that the necessary read or write request may be completed, a persistent request may be initiated as indicated by process block 58.

Generally, "persistent" requests persist at all nodes (i.e., processor units 12, and memory 16). All nodes remember that tokens (currently held or that arrive in the future) for a given block B (subject to the persistent request) should be forwarded to processor P (making the persistent request). To limit the number of states 70 that needs to be remembered, each processor is limited to K persistent requests, bounding the number of persistent requests in the system (and thus the number of entries in the table 34) to N*K. K is likely to be a small constant, and may be K=1.

There are two methods that may used to implement a persistent request. The first method requires a central arbiter such as the memory 16, although different blocks may have different arbiters so long as each node 12 can identify the arbiter for a particular node. This approach requires indirection of persistent request message transmission, first to the arbiter and then to other nodes. The second method is "distributed" and does not require this indirection.

Figures 7, 8:
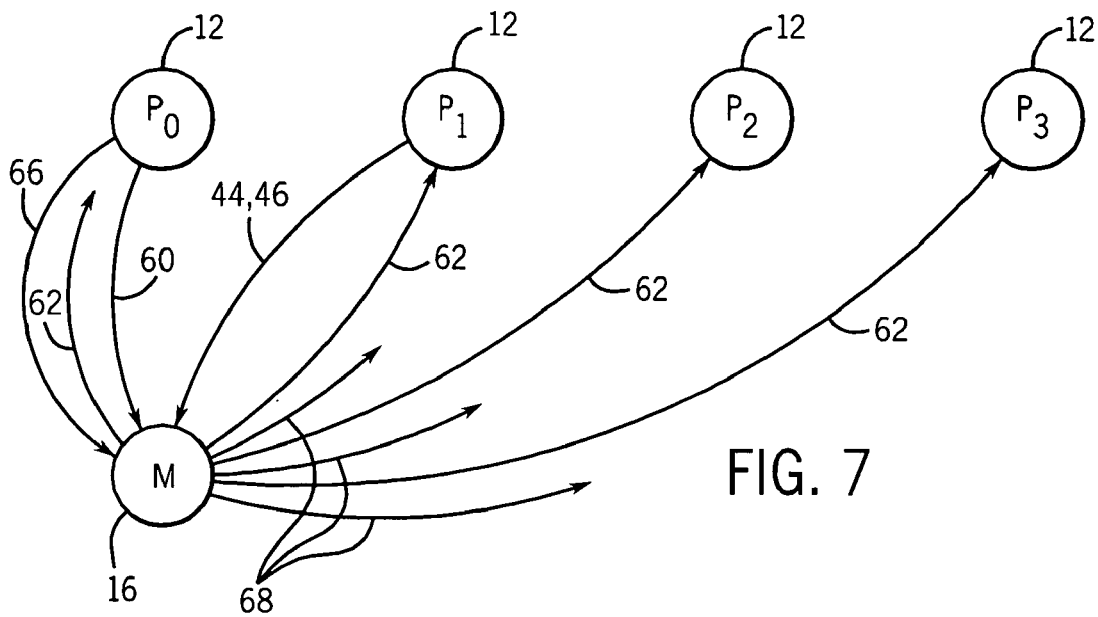
FIG. 7 is a figure similar to that of FIGS. 3 and 4 showing the flow of persistent request and deactivation messages when token transfer is delayed more than a predetermined amount.
FIG. 8 is a persistent request arbitration table that may be implemented in the processor units to allow for a more sophisticated arbitration without a central directory.

Referring to FIG. 7, in the first method, the persistent request message 60 may be transmitted, for example, from the first processor unit $P_0$ to the shared memory 16, the latter providing a central location to deal with possible multiple persistent requests for the same block from different nodes. The shared memory 16 thus may prioritize the requests so that only one persistent request message for a given block may be serviced at one time.

Assuming that the particular processor units $P_0$ initiating a persistent request is seeking access to a block 24 that is not subject to any other persistent requests, then the shared memory 16 (for example, as the home node for that block) submits an activation message 62 to all other nodes and to the requesting processor units $P_0$. Other subsequent persistent requests for that block are queued by the shared memory 16.

Referring to FIG. 2, when each node receives the activation message 62, it enrolls the identification of the processor unit ($P_0$) making a request in the persistence table 34 along with the identification of the block 24 for which the persistent request is being made. At this point onward, so long as the entry is in table 34, the node will forward the token 40 to the requesting processor unit ($P_0$) indicated in the first column of the table 34 whether the node currently has the token 40 or receives the token 40 subsequently. As has been discussed, data is forwarded only if the token 40 is the owner token. Each processor unit $P_0$ through $P_3$ is responsible for only invoking no more than a limited number of persistent requests at a time, thus limiting the size of the persistence tables 34 of each node shown in FIG. 2.

When the requesting processor unit 12 ($P_0$) has completed the memory access underlying the persistent request, that requesting processor unit ($P_0$) forwards a deactivation message 66 to the shared memory 16 which broadcasts the deactivation message 68 to all processor units 12. Upon receipt of the deactivation message 68, each node deletes the entry in the node's persistence table 34. The shared memory 16 may then activate another persistent request for that block from its queued persistent requests according to a preselected arbitration scheme, most simply, according to the next persistent request in queue.

More specifically, point-to-point order on the interconnect 14 or explicit acknowledgement messages can be used to handle races where activations/deactivations can cross each other in the interconnect 14. The sender does not send the next activation or deactivation message until it has received all the acknowledgement messages for the prior such message, thus preventing reorderings. As will be known to one skilled in the art, there are many alternative solutions such as using point-to-point ordering in the interconnection network to enforce in-order delivery or using message sequence numbers to detect and recover from message reorderings.

In the second decentralized method of handling persistent requests, each processor unit 12 directly broadcasts its persistent requests to all other nodes in the system 10. These nodes allocate an entry in their table 34 for this request. If two processor units 12 both issue persistent requests for the same block, all processor units 12 in the system must arbitrate to determine who should receive the tokens. This arbitration may be done by statically assigning a priority based on a numerical identification number previously assigned. Referring now to FIG. 8, for this purpose, each individual node may replace persistence table 34 with persistence table 70 similar to persistence table 34 listing persistent requests made by other nodes but not yet activated. The processor units 12 monitoring this table 70 may activate one such request on a global basis by following a common rule. For example, the rule may be that the next node in line for activation of its persistent request will be the node with the lowest numerical identification (described above)of the contesting nodes. This works in the presence of races, since two nodes may temporarily disagree on which node is the lowest, but eventually all nodes will agree and forward the tokens to the lowest numbered node.

Once a processor unit 12 is no longer starving, it deactivates persistent requests by broadcasting a deactivation to all nodes which clear the entry in their tables 70. To prevent the highest priority processor from starving other processors, the system must be careful as to when processors are allowed to issue subsequent persistent requests. For example, if a processor is allowed to issue a persistent request immediately, it may starve other processors, and if a processor is required to wait until its table is empty, other processors can starve it. In a preferred embodiment, when a processor unit 12 completes a persistent request, it marks each entry for the block currently in its table 70. This processor unit 12 must wait until all of the marked entries have been 'deactivated' and removed from the table 70 before issuing another persistent request for that block.

In other words, when a node completes a persistent request for an address A, it marks all persistent requests in its table 70 that match address A (add a "pending bit" (not shown) to table 70). Before issuing a persistent request for address A, a processor unit must consult its local table 70. If an address A matches AND the pending bit is set for that entry, then this is a second persistent request which must stall. Otherwise, it may proceed.

Referring again to FIG. 1, the use of an arbitration system that looks at numerical identifications ensures the data is first passed preferably within clusters of nodes thus reducing data transit time. This implementation of persistent requests can be performed in a distributed fashion within the nodes and thus does not require a central directory-type structure, the resulting indirection of message transfer, and can be implemented in so-called glueless systems where additional processor units 12 may be combined with minimal glue logic. Again, these features are not critical to the core correctness substrate provided by the tokens 40 of the present invention. As described, these approaches both use broadcast of the persistent request messages, but one could use a multicast to a predicted set of 'active' processors before resorting to broadcast, enhancing the scalability of the invention.

Empirically, the present inventors have determined that with most memory access requests, tokens 40 will be obtained immediately or via the back-off and request of process blocks 56 and 54 without the need for a persistent request message. Nevertheless, the indirection of communicating a persistent request message via the shared memory (or other designated node) introduces considerable delay in the transfer of data and may be desirably avoided by using a second, more sophisticated approach.

The above described token-based system for cache control clearly need not be implemented on a single integrated circuit but is broadly applicable to any cache system where multiple processing units compete for access to common memory and thus the present invention can be used in systems having network connected processing units including but not limited to Internet caching systems. Clearly, the invention can be implemented in hardware, firmware, or software or a combination of all three.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A computer system comprising:
   a) at least two processor units each having at least one processor and at least one cache;
   b) a shared collection of data;
   c) a communication channel allowing communication between the processor units and the shared collection of data;
   d) cache management means operating to:
      i) establish a set of tokens;
      ii) allow a processor to write to at least a portion of the shared collection of data through its cache only if the processor has all the tokens for that portion; and
      iii) allow a processor to read from at least a portion of the shared collection of data through its cache only if the processor has at least one of the tokens for that portion.

2. The computer system of claim 1 wherein the number of tokens is no less than the number of processor units.

3. The computer system of claim 1 further including the step of responding to a request by a requesting processor to write to a portion of memory by sending to other processors a request message for write privileges for the portion of memory; and
   wherein the cache management means responds to the request message by a receiving processor having at least one token by sending all tokens for that portion held by the receiving processor to the requesting processor.

4. The computer system of claim 3 wherein the cache management means broadcasts the request message to the other processors.

5. The computer system of claim 3 wherein one token is an owner token and wherein the cache management means responds to the request message to send the portion held by the receiving processor to the requesting processor only when the receiving processor holds the owner token.

6. The computer system of claim 3 wherein the cache management means responds to the request message without sending the portion held by the receiving processor to the requesting processor when the receiving processor does not hold the owner token.

7. The computer system of claim 1 further including the step of responding to a request by a requesting processor to read a portion of memory by sending to the other processors a request message for read privileges for the portion of memory and wherein the cache management means responds to the request message received by a receiving processor having at least one token to send at least one token for the portion held by the receiving processor to the requesting processor.

8. The computer system of claim 7 wherein the cache management means broadcasts the request message to the other processors.

9. The computer system of claim 7 wherein the cache management means sends only one token for that portion.

10. The computer system of claim 7 wherein one token is an owner token and wherein the cache management means responds to the request message to send a token other than the owner token for the portion unless the receiving processor has only one token and then sending the owner token for the portion.

11. The computer system of claim 7 wherein one token is an owner token and wherein the cache management means responds to the request message received by a receiving processor having all the tokens to send a token for the portion that is not the owner token unless the receiving processor has completed a writing to the portion and then sending all tokens for the portion to the requesting processor.

12. The computer system of claim 1 wherein the cache management means coordinates the transfer of tokens between processor units according to requests by the processor units to access of the shared collection of data by transmitting token requests and wherein the cache management means responds to a predefined failure of a requesting processor to obtain tokens by retransmitting a token request after a predetermined back-off time.

13. The computer system of claim 12 wherein the back-off time is randomized.

14. The computer system of claim 12 wherein the retransmission is repeated a predetermined number of times with increasing length of back-off time.

15. The computer system of claim 1 wherein the cache management means coordinates the transfer of tokens between processor units according to requests by the processor units to access of the shared collection of data by transmitting token requests and wherein the cache management means responds to a predefined failure of a requesting processor to obtain tokens by prioritizing token requests.

16. The computer system of claim 3 wherein the cache management means prioritizes token requests by sending to other processors a persistent activation signal requiring the other processor to forward tokens for that portion to the requesting processor until a deactivation message is received; and wherein the cache management means responds to the persistent activation signal received by a receiving processor to send all tokens for the portion held or received by the receiving processor between the occurrence of the persistent activation message and the deactivation signal.

17. The computer system of claim 16 wherein the cache management means responds to a predetermined failure of multiple requesting processors to obtain tokens by broadcasting the persistent activation signal of one of the requesting processors at a time according to a predetermined arbitration rule.

18. The computer system of claim 17 wherein the predetermined arbitration rule selects sending of persistent activation signals to minimize the communication costs of transmitting data between successive ones of the multiple requesting processors.

19. The computer system of claim 1 wherein the cache management means is distributed among the processor units and a memory holding the shared data.

20. The computer system of claim 1 where the communication channel provides an interconnect that is a non-ordered interconnect.

21. A method of operating a computer system having: a) at least two processor units each having a processor and cache; b) a shared collection of data; and c) an interconnect allowing communication between the processor units and the shared collection of data; comprising the steps of:
i) establishing a set of tokens no less in number than the number of processor units accessing shared collection of data;
ii) allowing a processor to write to at least a portion of the shared collection of data through its cache only if the processor has all the tokens for that portion; and
iii) allowing a processor to read from at least a portion of the shared collection of data through its cache only if the processor has at least one of the tokens for that portion.

22. The method of claim 21 further including the steps of: responding to a request by a requesting processor to write to a portion of memory by sending to other processors a request message for write privileges for the portion of memory; and
responding to the request message by a receiving processor having at least one token by sending all tokens for that portion held by the receiving processor to the requesting processor.

23. The method of claim 22 wherein the request message is broadcast to the other processors.

24. The method of claim 22 wherein one token is an owner token and further including the step of responding to the request message to send the portion held by the receiving processor to the requesting processor only when the receiving processor holds the owner token.

25. The method of claim 22 further including the step of responding to the request message without sending the portion held by the receiving processor to the requesting processor when the receiving processor does not hold the owner token.

26. The method of claim 21 further including the steps of responding to a request by a requesting processor to read a portion of memory by sending to the other processors a request message for read privileges for the portion of memory and responding to the request message received by a receiving processor having at least one token to send at least one token for the portion held by the receiving processor to the requesting processor.

27. The method of claim 26 wherein the request message is broadcast to the other processors.

28. The method of claim 26 wherein only one token for that portion is sent.

29. The method of claim 26 wherein one token is an owner token and further including the step of responding to the request message to send a token other than the owner token for the portion unless the receiving processor has only one token and then sending the owner token for the portion.

30. The method of claim 26 wherein one token is an owner token and further including the step of responding to the request message received by a receiving processor having all the tokens to send a token for the portion that is not the owner token unless the receiving processor has completed a writing to the portion and then sending all tokens for the portion to the requesting processor.

31. The method of claim 21 further including the step of coordinating the transfer of tokens between processor units according to requests by the processor units to access of the shared collection of data by transmitting token requests and responding to a predefined failure of a requesting processor to obtain tokens by retransmitting a token request after a predetermined back-off time.

32. The method of claim 31 wherein the back-off time is randomized.

33. The method of claim 31 wherein the retransmission is repeated a predetermined number of time with increasing length of back-off time.

34. The method of claim 21 further including the step of coordinating the transfer of tokens between processor units according to requests by the processor units to access of the shared collection of data by transmitting token requests and responding to a predefined failure of a requesting processor to obtain tokens by broadcasting to other processors a persistent activation signal requiring the other processor to forward tokens for that portion to the requesting processor until a deactivation message is received; and
further including the step of responding to the persistent activation signal received by a receiving processor to send all tokens for the portion held or received by the receiving processor between the occurrence of the persistent activation message and the deactivation signal.

35. The method of claim 32 further including the step of responding to a predetermined failure of multiple requesting processors to obtain tokens by broadcasting the persistent activation signal of one of the requesting processors at a time according to a predetermined arbitration rule.

36. The method of claim 35 wherein the predetermined arbitration rule selects sending of persistent activation signals to minimize the communication costs of transmitting data between successive ones of the multiple requesting processors.

* * * * *

UNITED STATES PATENT AND TRADEMARK OFFICE
CERTIFICATE OF CORRECTION

PATENT NO. : 6,981,097 B2
DATED : December 27, 2005
INVENTOR(S) : Milo M.K. Martin et al.

It is certified that error appears in the above-identified patent and that said Letters Patent is hereby corrected as shown below:

Column 1,
Lines 8-9, should read -- This invention was made with United States government support awarded by the following agency: NSF 9971256. The United States has certain rights in this invention. --.

Signed and Sealed this

Twenty-third Day of May, 2006

JON W. DUDAS
*Director of the United States Patent and Trademark Office*